United States Patent
Xu et al.

(10) Patent No.: US 7,946,135 B2
(45) Date of Patent: May 24, 2011

(54) EXTENDED-BAKING PROCESS FOR GLASS DEPOSITION TUBES

(75) Inventors: Guangjun Xu, Mayfield Heights, OH (US); Larry Zeng, Strongsville, OH (US); Ivo Flammer, Paris (FR); Dennis Robert Simons, Eindhoven (NL); Cedric Gonnet, Paris (FR); Rob Hubertus Matheus Deckers, Eindhoven (NL)

(73) Assignees: Draka Comteq, B.V., Amsterdam (NL); Momentive Performance Materials, Inc., Wilton, CT (US)

( * ) Notice: Subject to any disclaimer, the term of this patent is extended or adjusted under 35 U.S.C. 154(b) by 650 days.

(21) Appl. No.: 11/968,418

(22) Filed: Jan. 2, 2008

(65) Prior Publication Data

US 2008/0282743 A1 Nov. 20, 2008

Related U.S. Application Data

(60) Provisional application No. 60/883,092, filed on Jan. 2, 2007.

(51) Int. Cl.
*C03B 37/075* (2006.01)

(52) U.S. Cl. .............. 65/424; 65/417; 65/419; 65/427; 65/428; 65/425

(58) Field of Classification Search .............. 65/413, 65/417, 420, 421, 424, 426, 427, 428, 439
See application file for complete search history.

(56) References Cited

U.S. PATENT DOCUMENTS

| 3,782,914 A | 1/1974 | De Luca et al. | |
|---|---|---|---|
| 4,388,095 A | 6/1983 | Schneider et al. | |
| 4,504,297 A * | 3/1985 | Kosinski et al. | 65/426 |
| 5,106,402 A * | 4/1992 | Geittner et al. | 65/391 |
| 6,530,244 B1 * | 3/2003 | Oh et al. | 65/417 |
| 6,546,757 B1 | 4/2003 | Morse | |
| 6,687,444 B2 | 2/2004 | Antos et al. | |
| 6,739,155 B1 | 5/2004 | Giddings et al. | |
| 6,799,440 B2 | 10/2004 | Zeng et al. | |
| 6,952,516 B2 | 10/2005 | Takahashi et al. | |
| 6,988,379 B2 | 1/2006 | Orcel et al. | |
| 7,092,610 B2 | 8/2006 | Yamaguchi et al. | |
| 7,630,611 B2 | 12/2009 | Simons et al. | |
| 2002/0144521 A1 | 10/2002 | Orcel et al. | |
| 2003/0031441 A1 | 2/2003 | Simons et al. | |
| 2004/0146258 A1 * | 7/2004 | Yamamoto et al. | 385/123 |
| 2005/0000253 A1 | 1/2005 | Xie et al. | |
| 2005/0081565 A1 * | 4/2005 | Kato et al. | 65/61 |

(Continued)

FOREIGN PATENT DOCUMENTS

EP 1942081 A2 7/2008

(Continued)

OTHER PUBLICATIONS

Priority document of present application, U.S. Appl. No. 60/883,092, filed Jan. 2, 2007.

(Continued)

*Primary Examiner* — Queenie Dehghan
(74) *Attorney, Agent, or Firm* — Summa, Additon & Ashe, P.A.

(57) ABSTRACT

Disclosed is a method of heat treating quartz glass deposition tubes at between 900° C. and 1200° C. for at least 115 hours. The resulting deposition tubes are useful in forming optical preforms that can yield optical fibers having reduced added loss.

19 Claims, 4 Drawing Sheets

U.S. PATENT DOCUMENTS

| | | | |
|---|---|---|---|
| 2005/0120751 A1 | 6/2005 | Simons et al. | |
| 2005/0172676 A1 | 8/2005 | Roselieb et al. | |
| 2005/0223747 A1* | 10/2005 | Ball et al. | 65/397 |
| 2006/0191294 A1* | 8/2006 | Ganz et al. | 65/404 |
| 2007/0125129 A1* | 6/2007 | Dayanandan et al. | 65/414 |
| 2008/0282743 A1 | 11/2008 | Xu et al. | |

FOREIGN PATENT DOCUMENTS

| | | | |
|---|---|---|---|
| JP | 06293530 A | * | 10/1994 |

OTHER PUBLICATIONS

Extended European Search Report in counterpart European Application No. 08000008 dated Mar. 4, 2010.

* cited by examiner

EXTENDED-BAKING PROCESS FOR GLASS DEPOSITION TUBES

CROSS-REFERENCE TO PRIORITY APPLICATION

This application claims the benefit of U.S. Provisional Application No. 60/883,092, filed Jan. 2, 2007, for "Extended Baked Quartz Tubing and Articles Made Thereof," which is hereby incorporated by reference in its entirety.

FIELD OF THE INVENTION

The present invention relates to quartz glass tubings that are heat treated under reduced pressure for an extended period.

BACKGROUND OF THE INVENTION

The key performance parameters for optical fibers are attenuation (e.g., energy losses), dispersion, and mode-field diameter. Attenuation is the reduction of signal strength or light power over the length of the light-carrying medium. As a consequence of attenuation, a transmitted signal weakens and must be strengthened or repeated. Fiber attenuation, which is measured in decibels per kilometer (db/km), varies as a function of wavelength.

Attenuation specifications for the telecommunications industry have become increasingly rigorous. As compared to other transmission media (i.e., copper, coaxial cable, etc.), optical fiber requires low attenuation, typically 0.35 dB/km at a wavelength of 1385 nanometers for standard single-mode fiber (SSMF). Attenuation requirements at a wavelength of 1550 nanometers are even lower, typically 0.25 dB/km. Low attenuation provides a transmitted optical signal the ability to travel more than 100 kilometers without regeneration or amplification.

Attenuation in optical fibers can be caused by several different factors but is mostly a result of scattering and absorption. The scattering of light from molecular-level irregularities in the glass structure leads to the general shape of the attenuation curve, called Rayleigh scattering. Further attenuation is caused by light absorbed by residual materials (e.g., metals or water ions) within the fiber core and inner cladding.

The strong absorption at a wavelength of 1385 nanometers is due to hydroxyl groups present in the optical fiber. For instance, U.S. Patent Publication No. 2005/0120751 A1, which is hereby incorporated by reference in its entirety, discloses that, during the formation a glass preform during a chemical vapor deposition (CVD) process, hydrogen atoms in the glass form OH— bonds in the glass layers, thus adversely affecting the transmission spectrum of an optical fiber drawn from the preform, particularly at wavelengths of 1240 nanometers and 1385 nanometers.

U.S. Pat. No. 3,782,914, which is hereby incorporated by reference in its entirety, discloses a process for heat treating optical waveguides, which include a core of doped silicon dioxide ($SiO_2$) and a cladding of doped or undoped silicon dioxide ($SiO_2$), at 700° C. to 1200° C. for less than six hours. Such heat treatment purportedly oxidizes the reduced dopant oxide, which in turn reduces attenuation.

Furthermore, it is believed that transition metals and their interactions with the vacancies and impurities affect the wavelength and the absorption coefficient in optical fiber. For example, U.S. Pat. No. 7,092,610, which is hereby incorporated by reference in its entirety, discloses adding controlled amounts of transition metals (i.e., cobalt, nickel, chromium, vanadium, iron, manganese, thallium, and thulium) as dopants in an optical fiber to attenuate optical signals (e.g., in an optical attenuator or optical terminal device).

To reduce attenuation at a wavelength of 1550 nanometers, U.S. Pat. No. 6,952,516, which is hereby incorporated by reference in its entirety, discloses a hydrogen-proof treatment method, namely holding optical fiber in a treatment tank charged with $D_2$ (heavy hydrogen) for an extended period (e.g., three hours or more).

U.S. Pat. No. 6,799,440, which is hereby incorporated by reference in its entirety, suggests a method for improving attenuation in optical fiber by treating the quartz deposition tube that is used to make the glass preform, which itself is subsequently fabricated into optical fiber. This patent discloses a process in which silica tube is fused in a $D_2$ (heavy hydrogen) atmosphere to achieve decreased fiber attenuation. Alternatively, this patent discloses that the deposition tube can be formed from silica sand pretreated in a $D_2$ gas atmosphere prior to fusing the deposition tube.

Despite the foregoing, there is still a need for high-quality optical fiber that meets the rigorous demands of the telecommunication market. In particular, there is a corresponding demand for high-quality glass deposition tubes that facilitate the formation of optical preforms and optical fibers that employ reduced amounts of inner cladding material.

SUMMARY OF THE INVENTION

Accordingly, in one aspect the invention relates to quartz glass deposition tubes that facilitate the achievement of optical fibers having improved attenuation properties. In one exemplary embodiment, the invention embraces an optical fiber having attenuation of less than about 0.25 dB/km at a wavelength of 1550 nanometers In another aspect, the invention relates to methods for treating a quartz tube so that the resulting optical fiber possesses reduced attenuation properties. In one exemplary embodiment, the method includes baking a quartz deposition tube at about 900-1200° C. for at least 115 hours.

The foregoing, as well as other characteristics and advantages of the present invention, and the manner in which the same are accomplished, are further specified within the following detailed description and its accompanying drawings.

DETAILED DESCRIPTION

In one embodiment, the invention embraces a method of heat-treating precursor quartz glass deposition tubes for an extended period to improve the optical qualities of the deposition tubes. Thereafter, the heat-treated glass deposition tubes are formed into glass preforms.

The extended baking according to the present invention makes it possible to reduce the amount of material that must be deposited onto the inner surface of glass deposition tubes so as to form a sufficiently thick layer of deposited material (i.e., glassy soot) that will become the inner cladding in resulting optical fibers. In effect, the method according to the present invention yields production efficiencies in the formation of optical preforms by first achieving an improved quartz glass substrate (i.e., a deposition tube).

The optical fibers drawn from the resulting glass preforms (i.e., the collapsed, heat-treated quartz glass deposition tubes) have excellent, reduced attenuation of less than 0.25 dB/km at a wavelength of 1550 nanometers and a b/a ratio of 3.0 or less.

Figure 1:
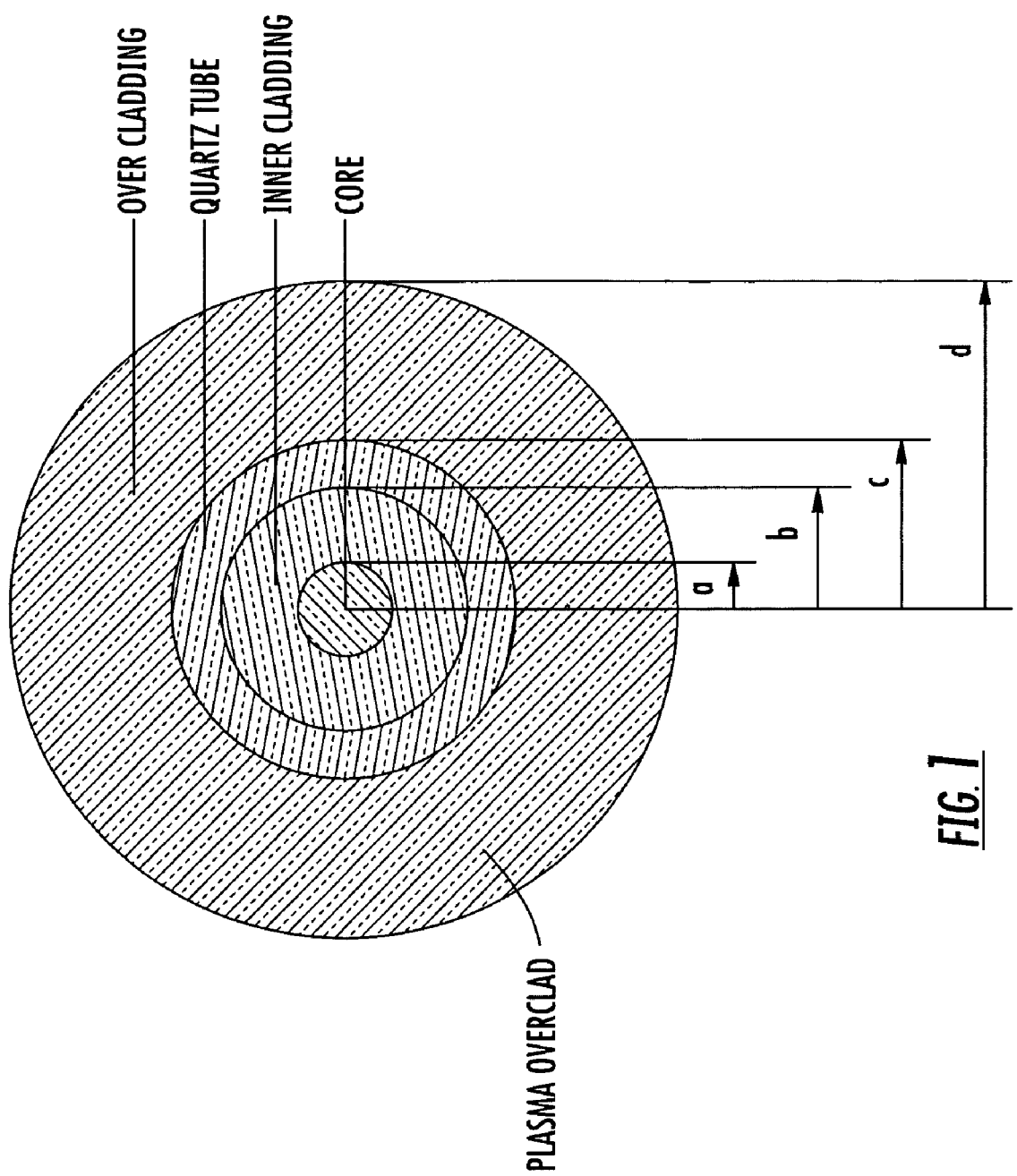
FIG. 1 schematically depicts the cross-section of an exemplary optical fiber.

As will be understood by those having ordinary skill in the art, the b/a ratio describes the relationship between the outer diameter of the inner cladding and the diameter of the core. In this regard and as depicted in FIG. 1, the b/a ratio may be determined with respect to a glass preform or its resulting optical fiber, which, of course, will maintain the glass preform's relative geometry.

As used herein, approximating language may be applied to modify any quantitative representation that may vary without resulting in a change in the basic function to which it is related. Accordingly, a value modified by a term or terms, such as "about" and "substantially," may not to be limited to the precise value specified in some cases.

As used herein, the term "tube" or "tubing" may be used interchangeably to refer to an elongated product made from fused quartz glass, which is used as a deposition tube or a substrate tube in making a quartz preform, for subsequent manufacture into an optical fiber product.

As used herein, the term "baked" may be used interchangeable with "heat treated," "vacuum baked," or "heat treatment," to refer to a process wherein a quartz tube is heated to a temperature of at least 900° C. Such heat treatment may occur in a vacuum environment (i.e., under reduced pressure) or in the presence of one or more inert gases (e.g., helium) or specialty gases (e.g., $D_2$ or $N_2$). Typically, such heat treatment occurs in an environment that is substantially free of hydrogen. In this regard, to the extent that the heat treatment proceeds in an environment in which the concentration of hydrogen and/or hydrogen-bearing species is insubstantial (e.g., the chemical potential of hydrogen is higher in the substrate tube than in the heat-treatment environment), hydrogen will tend to diffuse from the substrate tube during heat treatment in accordance with the present invention.

Although the terms may be used to denote compositions or articles of different materials (e.g., different silica concentrations), as used herein, the term "glass" may be used interchangeably with "quartz glass" or "quartz" or "fused quartz," to refer to a composition, a part, a product, or an article formed by melting a mixture that includes natural or synthetic sand (silica). Natural sand and/or synthetic sand can be used in the tubing according to the present invention, and so the term "glass" is used to denote compositions that include naturally occurring crystalline silica (e.g., sand or rock), synthetically derived silicon dioxide (silica), or a mixture of both. The term "sand" may be used interchangeably with silica and silicon dioxide to denote either natural sand, synthetic sand, or a mixture of both.

Optical Fiber Manufacturing Processes

As known by those having ordinary skill in the art, an optical fiber is manufactured from silicon dioxide by either of two processes.

The first is the crucible method in which powdered silica is melted. The crucible method, now mostly obsolete, produces relatively fatter multimode fibers that are suitable for short-distance transmission of many light-wave signals.

The second is the vapor deposition process, which creates a solid cylinder of core and cladding material that is then heated and drawn into a thin fiber that is suitable for long-distance communications. There are various vapor deposition techniques, including but not limited to Outer Vapor Phase Deposition, Vapor Phase Axial Deposition, Modified Chemical Vapor Deposition (MCVD), and Plasma Vapor Phase Deposition (PCVD).

MCVD is one of the most common manufacturing techniques, yielding a low-loss fiber that is well suited for long-distance cables. In many deposition processes (e.g., MCVD and PCVD), a hollow quartz deposition tube is used as the starting feedstock for making the cylindrical optical preform. It is the optical preform from which continuous optical fibers can be drawn (e.g., optical fibers of 300 kilometers or more in length).

Figure 2:
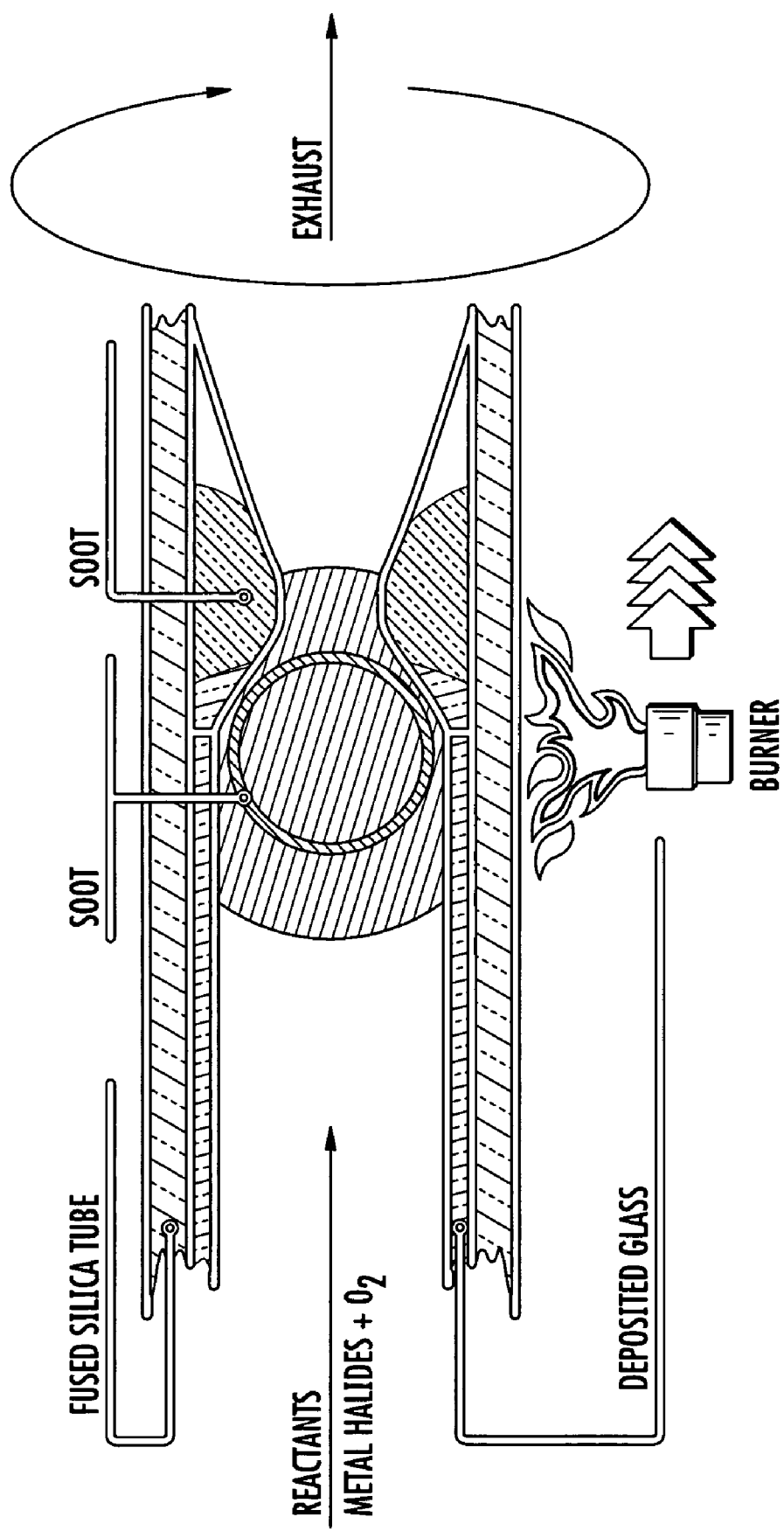
FIG. 2 schematically depicts the formation of a glass preform via modified chemical vapor deposition (MCVD).

As schematically depicted in FIG. 2, in an exemplary MCVD process a gaseous stream of pure oxygen and various chemical vapors is directed into the quartz deposition tube so that successive layers of specially formulated silica is deposited onto the deposition tube's inner surface. As the oxygen contacts the hot surface of the tube—a flame underneath the deposition tube keeps its walls very hot—high purity silica is formed. In this way, layers of glassy soot are deposited inside the deposition tube. Accordingly, after collapsing the deposition tube to form an optical preform and thereafter drawing optical fiber, the deposited soot corresponds to the optical fiber's core and the quartz deposition tube corresponds to the optical fiber's outer sheath or cladding. This is schematically depicted in FIG. 1.

Figure 3:
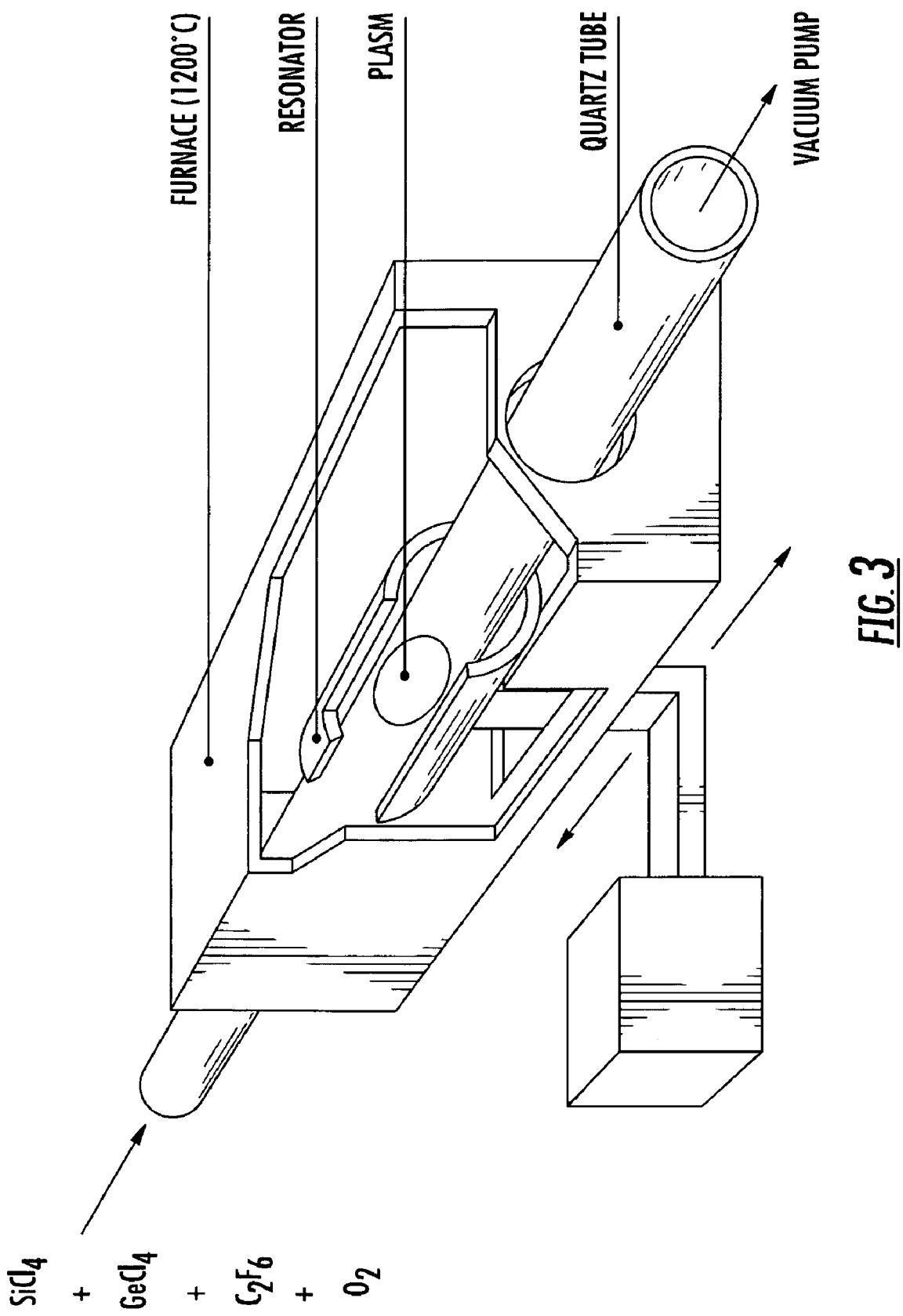
FIG. 3 schematically depicts the formation of a glass preform via plasma chemical vapor deposition (PCVD).

As schematically depicted in FIG. 3, in an exemplary PCVD process, a quartz substrate tube is positioned along the cylindrical axis of a resonator. The inside of the substrate tube is flushed with a gaseous mixture that includes $O_2$, $SiCl_4$, $GeCl_2$, and, optionally, $C_2F_6$ to reduce the refractive index of the doped silica. Localized plasma is concurrently generated within the cavity, causing the reaction of silicon, oxygen, and germanium to produce direct deposition of germanium-doped $SiO_x$ on the substrate tube's inner surface. Such deposition only occurs near the localized plasma, and so the resonant cavity is moved along the cylindrical axis of the substrate tube to uniformly coat its entire length. When deposition is complete, the substrate tube is thermally collapsed into a rod (i.e., a preform) having a germanium-doped silica core portion and a surrounding undoped silica cladding portion. Furthermore, prior to drawing, the preform may be placed in a so-called jacket tube, which is typically formed of undoped silica, so as to increase the quantity of undoped silica relative to doped silica in the resulting optical fiber.

Figure 4:
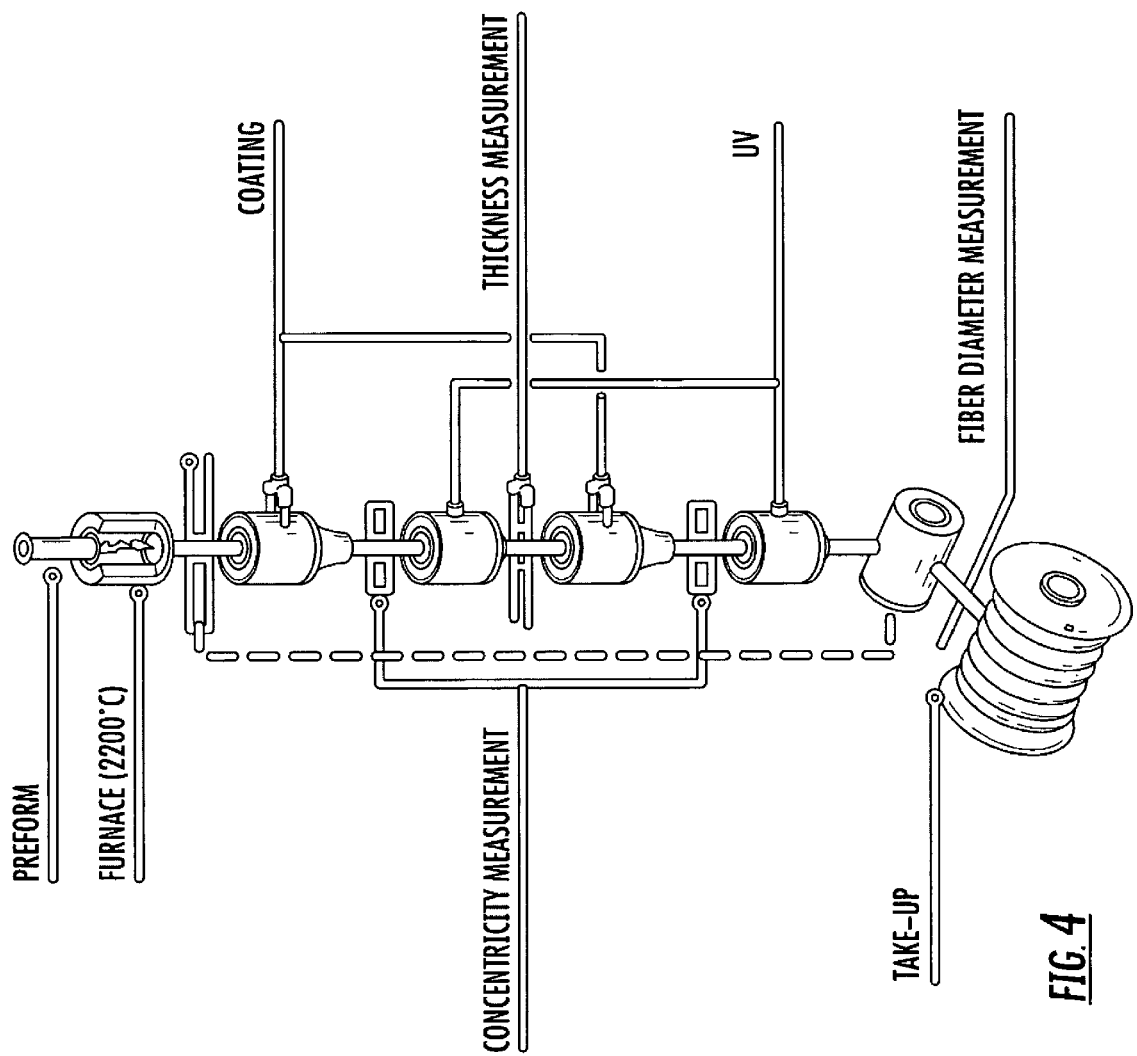
FIG. 4 schematically depicts the drawing of optical fiber from a glass preform.

Whether formed via MCVD, PCVD, or other process, the preform is heated and drawn to achieve optical fiber. As schematically depicted in FIG. 4, the preform is positioned in a drawing tower, whereupon the preform tip is heated and an optical fiber is drawn (i.e., pulled out as a line and threaded onto a tractor assembly). The fiber progresses through an on-line, laser-based monitor that measures the diameter several hundred times per second to maintain the target outside diameter. By repeatedly measuring the resultant fiber diameter, the draw speed can be controlled to maintain the fiber diameter.

Optical fibers may be connected to each other by connectors or by splicing (i.e., joining two optical fibers together to form a continuous optical waveguide). By way of example, a typical glass preform having a length of 0.5 meter to a few meters and a diameter of only 10 to 50 millimeters produces many kilometers of optical fibers drawn down to a typical standard diameter of 125 microns. Indeed, single-mode-fiber optical preforms frequently possess outer diameters of 150 millimeters or more.

In an exemplary embodiment of a single mode fiber, the preform is drawn to an optical fiber having an outer diameter of about 125 microns and a core diameter of about 8-9 microns. In an exemplary embodiment of a multimode optical fiber, the preform is drawn to an optical fiber having an outer diameter of about 125 microns and a core diameter of about 50 microns to 62.5 microns. Referring to FIG. 1, the core of an exemplary optical fiber corresponds to radius a, and its outer diameter corresponds to radius d (i.e., the overcladding).

Optical fiber geometry and physical dimensions are important factors in splice loss, splice yield, and attenuation. As noted, FIG. 1 schematically depicts a cross-section of an exemplary optical fiber. As will be understood by those having ordinary skill in the art, important factors in fiber geometry include cladding diameter, core/clad concentricity, and fiber curl. It is particularly desirable for the b/a ratio (i.e., the ratio of the inner cladding diameter to the core diameter) to be kept as small as possible. In this regard, reducing the inner cladding thickness reduces production time (i.e., the required glass deposition) and conserves expensive raw materials necessary to form the inner cladding. That said, those having ordinary skill in the art will recognize that reducing optical fiber b/a ratio tends to increase attenuation.

Extended-Baked Quartz Deposition Tubing Feedstock

According to the present invention, the quartz deposition tube is heat-treated prior to the vapor deposition process.

For example, in one exemplary embodiment, the quartz deposition tube is heat treated under vacuum (i.e., reduced pressure) at a temperature of at least 900° C. for at least 125 hours.

In a second exemplary embodiment, the heat treatment (i.e., the extended baking) of the quartz deposition tube occurs at a temperature of between about 1000° C. and 1200° C. for at least 150 hours under reduced pressure of between about 1 and 100 millitorr (e.g., 50-75 millitorr or so).

In a third exemplary embodiment, the heat treatment of the quartz deposition tube occurs at a temperature of between about 900° C. and 1200° C. for at least 200 hours under reduced pressure of between about 10 and 100 millitorr.

In a fourth exemplary embodiment, the heat treatment of the quartz deposition tube occurs at a temperature of between about 1000° C. and 1100° C. for at least 300 hours.

In a fifth exemplary embodiment, the heat treatment (i.e., the extended baking) of the quartz deposition tube lasts for at least 400 hours.

In a sixth exemplary embodiment, the heat treatment (i.e., the extended baking) of the quartz deposition tube lasts for at least 450 hours under reduced pressure of less than 100 millitorr.

Quartz deposition tubes for use in the extended baking process of the present invention can be made by methods known in the art (e.g., flame hydrolysis or electric fusion processes). The extended baking step can be an integral step in such methods for making quartz deposition tubes (i.e., after the continuous tube drawing step forms the deposition tubes of desired lengths and sizes). The extended baking step can also be a separate or integral step in a method for forming the cylindrical preform, wherein commercially available quartz tubes are heat-treated before being used as deposition tubes in a vapor deposition process.

Suitable quartz deposition tubes for use in the extended baking process of the present invention are commercially available from various suppliers, including but not limited to Momentive Performance Materials Inc., Saint Gobain, and Shin-Etsu Quartz Products, Co., Ltd. Such commercially available quartz deposition tubes typically possess at least 99.995 weight percent silicon dioxide ($SiO_2$) purity.

In one embodiment according to the present invention, the deposition tubing includes synthetic silica, which provides excellent higher tensile strength required for producing long length fibers. In one exemplary embodiment, the quartz tubes include high-purity sand having less than 100 ppb iron (i.e., <100 ppb Fe) and less than 100 ppm aluminum (i.e., <100 ppm Al). In a second exemplary embodiment, the quartz tubes include high-purity sand having less than 80 ppb iron (i.e., <80 ppb Fe) and less than 60 ppm aluminum (i.e., <60 ppm Al). In a third exemplary embodiment, the quartz tubes include high-purity sand having less than 50 ppb iron (i.e., <50 ppb Fe) and between about 5 and 15 ppm aluminum (i.e., about 5-15 ppm Al).

In another embodiment according to the present invention, the quartz tubes are made from an electric fusion process (as opposed to a flame hydrolysis process) to provide tight dimensional control in the subsequent manufacture of the optical fiber. By way of example, the feedstock quartz tubes made from the electric fusion process typically contain less than 100 ppm halogen, more typically less than 10 ppm halogen, and most typically less than 1 ppm halogen.

Optical Fiber of the Present Invention

As noted, the extended-baked quartz deposition tubes of the present invention can be used to manufacture both single-mode optical fibers having reduced attenuation and multimode optical fibers having reduced attenuation.

As is known, a single-mode optical fiber has a diameter of about 125 microns and a relatively smaller core (e.g., 8-10 microns). A single-mode optical fiber can be used to carry a mode over very long distances.

A multimode optical fiber, on the other hand, typically has a diameter of about 125 microns or so and a relatively larger core (e.g., 50 microns or 62.5 microns). A multimode optical fiber can be used to carry two or more modes over shorter distances; it is typically used in urban systems where many signals must be carried to central switching stations for distribution.

In one exemplary embodiment, the optical fiber has an attenuation of less than 0.20 dB/km at a wavelength of 1550 nanometers.

In a second exemplary embodiment, the optical fiber has a b/a ratio of 3.0 or less and added loss of less than 0.02 dB/km at a wavelength of 1550 nanometers.

In a third exemplary embodiment, the optical fiber has a b/a ratio of 2.8 or less and added loss of less than 0.01 dB/km at a wavelength of 1550 nanometers.

In a fourth exemplary embodiment, the optical fiber has added loss of less than 0.005 dB/km at a wavelength of 1550 nanometers.

In a fifth exemplary embodiment, the optical fiber has a b/a ratio of 2.4 or less.

In a sixth exemplary embodiment, the low-attenuation optical fiber has low halogen content (e.g., 100 ppm or less as previously described with respect to the substrate tubes).

The following examples are provided to illustrate the invention but are not intended to limit its scope. The quartz deposition tubes discussed are commercially available, for example, from Momentive Performance Materials Inc. (Ohio, USA) as GE095 fused quartz tubing.

Example 1

Comparative

A quartz deposition tube having residual OH level of about 1 ppm and residual iron contamination of about 100 ppb has an intrinsic attenuation level of 40 dB/km at a wavelength of 1385 nanometers and 10 dB/km at a wavelength of 1550 nanometers.

When formed into an optical fiber having a b/a ratio of 2.4, the optical fiber has an intrinsic attenuation of about 0.28 dB/km at a wavelength of 1385 nanometers and about 0.18 dB/km at a wavelength of 1550 nanometers, and additional fiber attenuation of 0.06 dB/km at a wavelength of 1385 nanometers and 0.04 dB/km at a wavelength of 1550 nanometers. Thus, for an optical fiber resulting from a quartz deposition tube of the prior art, the overall total fiber attenuation is greater than 0.34 dB/km at a wavelength of 1385 nanometers and greater than 0.22 dB/km at a wavelength of 1550 nanometers.

Example 2

The quartz deposition tubes of comparative Example 1 are heat treated (i.e., an extended baking) for 150 hours at 1090° C. under vacuum conditions (i.e., less than 50 millitorr) before being formed into a preform and drawn into optical fiber. The extended baking of the quartz deposition tube significantly reduces additional attenuation in the resulting optical fiber.

In this regard, the resulting optical fiber, which likewise has a b/a ratio of 2.4, possesses total attenuation of 0.29 dB/km and 0.185 dB/km at wavelengths of 1385 nanometers and 1550 nanometers, respectively, and thus additional fiber attenuation of only about 0.01 dB/km at a wavelength of 1385 nanometers and 0.005 dB/km at a wavelength of 1550 nanometers. As those having ordinary skill in the art will appreciate, these are at least six-fold and eight-fold reductions in additional fiber attenuation, respectively, as compared with the conventional optical fiber described in comparative Example 1. More generally, the extended baking process has been found to reduce additional fiber attenuation by a factor of ten or more.

The extended baking also shifts the $Fe^{3+}:Fe^{2+}$ ratio. The fraction of $Fe^{3+}$ increased at least ten percent; the fraction of $Fe^{2+}$ decreased correspondingly. In one embodiment, the $Fe^{3+}:Fe^{2+}$ ratio is characterized by UV-IR absorption spectra, with $Fe^{2+}$ having an absorption peak at a wavelength of 1100 nanometers and $Fe^{3+}$ having an absorption peak at a wavelength of 240 nanometers.

In the specification and figures, typical embodiments of the invention have been disclosed. The present invention is not limited to such exemplary embodiments. Unless otherwise noted, specific terms have been used in a generic and descriptive sense and not for purposes of limitation.

This written description uses examples to disclose the invention, including the best mode, and also to enable any person skilled in the art to make and use the invention. The scope of the invention as claimed may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referenced herein are hereby expressly incorporated by reference.

The invention claimed is:

1. An extended-baking method for improving the optical properties of a glass deposition tube, comprising the step of subjecting the glass deposition tube to heat-treatment at about 900° C. or higher for at least about 115 hours.

2. A method according to claim 1, wherein the step of subjecting the glass deposition tube to heat-treatment comprises subjecting the glass deposition tube to heat-treatment of between about 1000° C. and 1100° C. for at least about 125 hours.

3. A method according to claim 1, wherein the step of subjecting the glass deposition tube to heat-treatment comprises subjecting the glass deposition tube to heat-treatment of between about 900° C. and 1200° C. under reduced pressure of less than about 100 millitorr for at least about 200 hours.

4. A method according to claim 1, wherein the step of subjecting the glass deposition tube to heat-treatment comprises subjecting the glass deposition tube to heat-treatment at about 900° C. or more for at least about 400 hours.

5. A method according to claim 1, wherein the step of subjecting the glass deposition tube to heat-treatment comprises subjecting the glass deposition tube to heat-treatment under reduced pressure of between about 10 millitorr and 100 millitorr.

6. A method according to claim 1, wherein the step of subjecting the glass deposition tube to heat-treatment comprises subjecting the glass deposition tube to heat-treatment under reduced pressure of less than about 50 millitorr.

7. A method according to claim 1, wherein the step of subjecting the glass deposition tube to heat-treatment comprises subjecting the glass deposition tube to heat-treatment under reduced pressure of less than 10 millitorr.

8. A method according to claim 1, wherein the step of subjecting the glass deposition tube to heat-treatment comprises subjecting the glass deposition tube to heat-treatment in an inert-gas environment.

9. A method according to claim 1, wherein the step of subjecting the glass deposition tube to heat-treatment comprises subjecting the glass deposition tube to heat-treatment in an environment that is substantially free of hydrogen and/or hydrogen-bearing species.

10. A method according to claim 1, wherein the glass deposition tube possesses less than 100 ppm halogen.

11. A method according to claim 1, wherein the glass deposition tube possesses less than 100 ppb iron and less than 100 ppm aluminum.

12. A method according to claim 1, further comprising:
depositing a glass inner cladding layer and a glass core layer, respectively, into the interior of the heat-treated glass deposition tube; and
collapsing the heat-treated glass deposition tube to yield an optical preform.

13. A method according to claim 12, further comprising the step of drawing an optical fiber from the optical preform.

14. A method for making an improved optical preform having reduced inner-cladding-to-core ratio and low attenuation, the method comprising:
providing a quartz glass deposition tube;
baking the quartz glass deposition tube for at least about 125 hours at about 900° C. or higher at a reduced pressure of less than about 100 millitorr;
depositing a glass inner cladding layer onto the interior surface of the quartz glass deposition tube;
depositing a glass core layer onto the glass cladding layer; and thereafter collapsing the quartz glass deposition tube to yield an optical preform;

wherein the steps of depositing an inner cladding layer and depositing a core layer together comprise depositing glass layers in amounts sufficient to yield an optical preform having an inner-cladding-to-core ratio (b/a) of less than about 3.0.

15. A method for making an improved optical preform according to claim 14, wherein the step of providing a quartz glass deposition tube comprises forming a quartz glass deposition tube via an electric fusion process to yield a quartz glass deposition tube having halogen content of less than about 100 ppm.

16. A method for making an improved optical preform according to claim 15, wherein the step of forming a quartz glass deposition tube via an electric fusion process yields a quartz glass deposition tube having halogen content of less than about 10 ppm.

17. A method for making an improved optical preform according to claim 16, wherein the step of forming a quartz glass deposition tube via an electric fusion process yields a quartz glass deposition tube having halogen content of less than about 1 ppm.

18. A method for making an improved optical preform according to claim 16, further comprising the step of drawing the optical preform into an optical fiber having an attenuation of less than 0.20 dB/km at a wavelength of 1550 nanometers.

19. A method for making an improved optical preform according to claim 14, further comprising the step of drawing the optical preform into an optical fiber having an inner-cladding-to-core ratio (b/a) of less than about 2.4 and additional attenuation of less than about 0.02 dB/km at a wavelength of 1550 nanometers.

* * * * *